United States Patent [19]

De Lucchi

[11] 4,040,343

[45] Aug. 9, 1977

[54] CHARCOAL BROILER

[76] Inventor: Gerald B. De Lucchi, 2012 Greenwich St., San Francisco, Calif. 94123

[21] Appl. No.: 537,096

[22] Filed: Dec. 30, 1974

[51] Int. Cl.² .......................... A47J 37/04; F24C 1/16
[52] U.S. Cl. .................. 99/421 H; 126/9 R
[58] Field of Search ................ 99/340, 390, 391, 419, 99/420, 421, 422, 426, 427; 126/25 R, 25 A, 25 HA, 9 R

[56] References Cited

U.S. PATENT DOCUMENTS

| | | | |
|---|---|---|---|
| 2,379,239 | 6/1945 | Krebs | 99/421 HV |
| 2,718,845 | 9/1955 | Dudley | 99/421 HH |
| 2,774,345 | 12/1956 | Peplin | 99/340 |
| 2,792,773 | 5/1957 | Barker | 126/25 A |
| 3,056,344 | 10/1962 | Miller | 99/390 |
| 3,175,549 | 3/1965 | Bergsten | 126/25 |
| 3,285,238 | 11/1966 | Norlie | 99/421 HH |
| 3,285,239 | 11/1966 | Drake | 126/25 A |
| 3,358,587 | 12/1967 | Hunt et al. | 99/421 H |

FOREIGN PATENT DOCUMENTS 669,321  8/1963  Canada .................... 126/25

Primary Examiner—Harvey C. Hornsby
Assistant Examiner—Robert Pous
Attorney, Agent, or Firm—Flehr, Hohbach, Test, Albritton & Herbert

[57] ABSTRACT

A charcoal broiler is disclosed which includes a housing having first and second sets of legs adapted to support the broiler between alternate horizontal and vertical orientations. The broiler includes a fuel-containing basket which is supported within the housing in spaced, parallel relationship with one sidewall in a manner such that the fuel is held away from the walls of the housing to facilitate air circulation for rapid burning. A hood is mounted on the housing for pivotal movement to and from an open top of the housing, with adjustable lock means being provided to selectively control the amount of opening between the hood and housing for controlling the air draft. Adjustable vents are provided in the housing for further control of the air draft. A grid-like tray is provided for supporting food above the basket when the housing is in its horizontal orientation, and a spit is provided for supporting food in the housing with the hood substantially closed when the housing is in its vertical orientation. The hood has a handle mounted at its center so that the broiler may be shifted to its horizontal or vertical orientation by applying a force to the handle.

5 Claims, 3 Drawing Figures

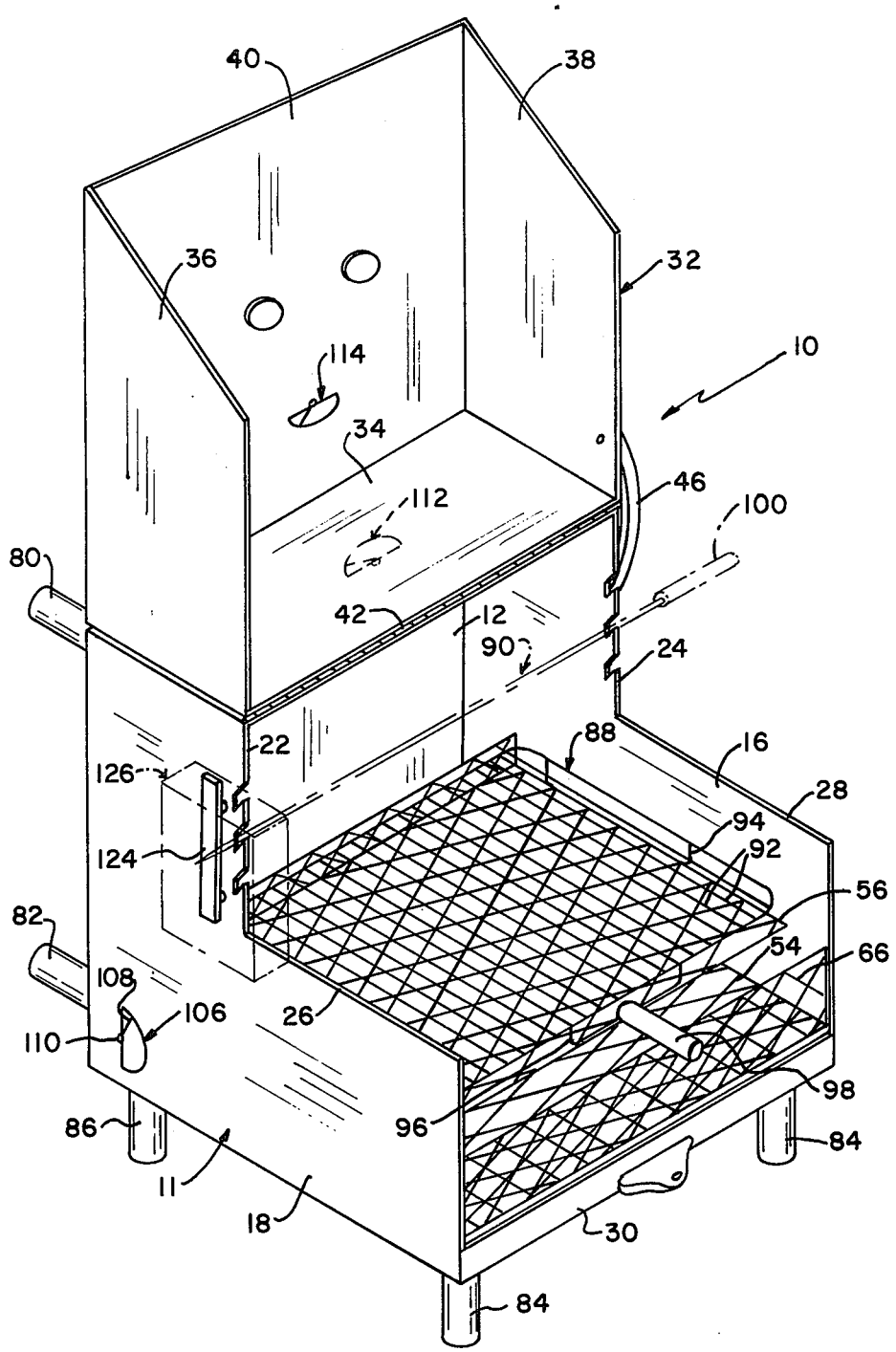
FIG.—1

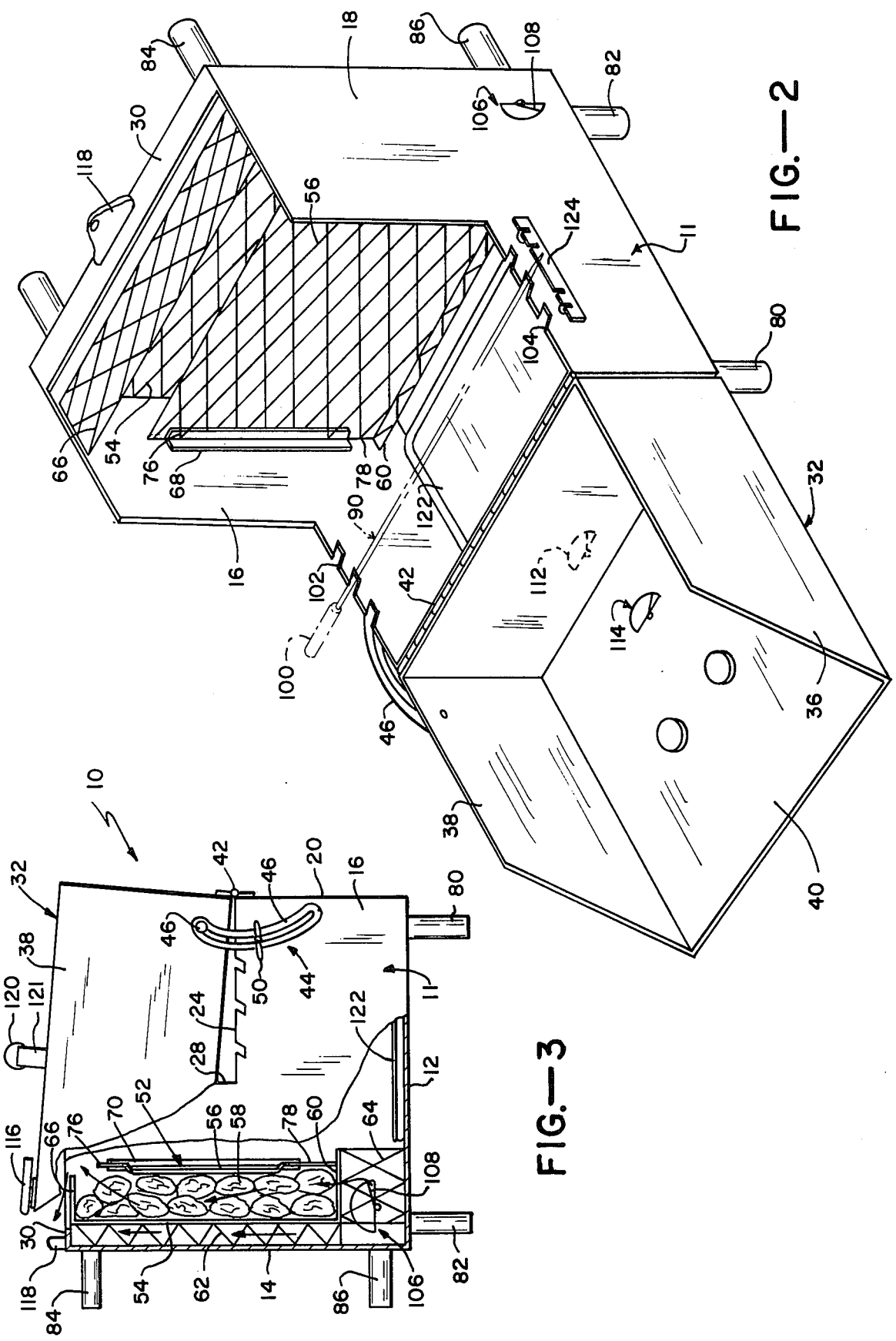

CHARCOAL BROILER

BACKGROUND OF THE INVENTION

This invention relates to charcoal broilers of the portable type used for cooking foods such as hamburgers, hot dogs, steaks or a roast, and the like.

A number of different portable charcoal broilers have been provided in the prior art. Typically such broilers employ the use of bowls or trays for containing fuel such as charcoal briquets, with a rotary or stationary grill being provided for supporting the food adjacent the burning coals. However, the prior art charcoal broilers have not been completely satisfactory for various reasons. In many cases either insufficient draft is supplied to the coals, or heat is inefficiently used or is lost, with the result that the cooking time is increased and fuel is wasted. In many of the prior art designs heat is not evenly applied about the food, such as fowl or a roast, so that it is necessary to employ a rotisserie to constantly turn the food. In certain of the prior broilers it is unavoidable that grease drippings from the food fall onto the burning coals. This creates smoke and odors, which can be objectionable in a confined space. Such latter type broilers have no provision for cooking in one position such that the grease can drop free of the coals, or in an alternate position where the drippings can be used to create a smoked flavor, as desired. Thus there is a need for a new and improved charcoal broiler which will obviate the foregoing problems and shortcomings of existing designs.

OBJECTS AND SUMMARY OF THE INVENTION

It is a general object of the invention to provide a new and improved charcoal broiler. A more particular object is to provide a new and improved portable charcoal broiler.

Another object is to provide a charcoal broiler of the type described which can be employed in alternate orientations, one of which orients the burning coals vertically on one side of the food so that grease drippings can be collected free of the coals in an underlying pan, and another of which orients the coals horizontally below food which is supported on a grid-like tay or on a spit.

Another object is to provide a charcoal broiler of the type described whereby the burning coals are held by a basket within a housing on one side of the food such that radiant energy is reflected from the inner walls of the housing for uniformly cooking the food without the requirement for a rotisserie.

Another object is to provide a charcoal broiler of the type described in which food is cooked within a housing having a hood which can be locked in a selected position for varying the rate of air circulation through the housing and thereby regulating the rate of burning of the coals.

Another object is to provide a charcoal broiler of the type described in which the coals are contained within the housing by means of a perforate basket which is mounted in spaced relationship with a sidewall and floor of the housing for optimum air circulation, and with adjustable air vents being provided in the housing for controlling the rate of air ventilation.

The invention provides a charcoal broiler which comprises a housing having a bottom floor, an open top and a plurality of sidewalls. A hood is mounted on the housing for pivotal movement to open and close the top of the housing, with a lock being provided to support the hood at a selected position for controlling the rate of air circulation from the housing. A fuel-containing basket comprising inner and outer perforate racks is supported within the housing in spaced, parallel relationship with a first sidewall, and in spaced relationship above the floor of the housing. Air vents are formed in the housing adjacent one end of the basket. A first set of legs is provided on the outside of the floor for supporting the housing in an orientation with the basket positioned vertically, and a second set of legs is provided on the outside of the first sidewall for supporting the housing in another orientation with the basket positioned horizontally. A grid-like tray is removably mounted within the housing above the basket for supporting the food in the horizontal orientation, and a pan is removably mounted within the housing in its vertical orientation. A spit is mounted on one side of the basket for supporting the food in either of the vertical or horizontal orientations.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a perspective view of a charcoal broiler of the invention shown in its horizontal orientation;

FIG. 2 is a perspective view of the charcoal broiler of FIG. 1 illustrating the broiler in is vertical orientation; and FIG. 3 is an end elevation view, partially cutaway, of the broiler in the orientation of FIG. 2 showing the hood thereof spaced from its closed position.

DESCRIPTION OF THE PREFERRED EMBODIMENTS

The drawings illustrate generally at 10 a charcoal broiler constructed in accordance with the invention. The broiler includes a housing 11, preferably of sheet metal construction, defined by a bottom floor 12, an upstanding firt sidewall 14, a pair of sidewalls 16, 18 having cut-out portions, and an upper ledge 20 which extends across the upper end margins of sidewalls 16 and 18. The cut-out portions of sidewalls 16 and 18 are each formed by edges 22, 24 which are parallel with floor 12, together with edges 26, 28 which are parallel with first sidewall 14. A relatively narrow ledge 30 is mounted across the outer end margins of sidewalls 16 and 18 adjacent the upper end of sidewall 14. The cut-out portions of the sidewalls thereby cooperate with ledges 20 and 30 to form an open top for the housing.

A hood 32 is provided for closing the top of the housing. The hood, which preferably is of sheet metal construction, includes an end wall 34 formed integral with a pair of sidewalls 36, 38 and a top wall 40. Hood 32 is mounted for pivctal movement on the housing by suitable means such as the interlocking hinge and rod pivot joint 42 which is mounted between the forward edge of ledge 20 and the forward edge of hood end wall 34. The ends of hood sidewalls 36 and 38 are beveled and are fitted so as to pivot down about the outer surfaces of housing sidewalls 16 and 18. The pivot joint 42 provides a pivot axis which is horizontally offset from the center of balance of the housing where the housing is supported in a vertical position as illustrated in FIG. 3.

A hood support and lock device 44 is provided for supporting hood 32 in a selected position relative to the open end of the housing. The lock device 44 includes a slotted, arcuate member 46 which is mounted at one end by a fastener 48 to the corner of hood sidewall 38, with the member 46 extending in an arc about a radius from pivot joint 42. The slot of member 46 slides about a suitable threaded stud or screw which is mounted to and projects outwardly from the corner of sidewall 38. A sutiable wing nut 50 is mounted on the screw for manually tightening and locking the member 46 at a selected position relative to the housing. Hood 32 can thereby be locked so that its side edges are at any desired spacing from the housing for adjusting the rate of air circulation from the housing. FIG. 3 illustrates a typical locked position of the hood to permit air circulation from the housing.

A perforate fuel-containing basket 52 is mounted within the housing at a position spaced from and parallel with housing sidewall 14. Preferably basket 52 is constructed of expanded metal and includes an inner perforate ack 54 spaced from sidewall 14 together with an outer perforate rack 56 spaced from the inner rack to define a volume for containing fuel such as the illustrated charcoal briquets 58. A bottom perforate rack 60 holds the fuel in spaced relationship above floor 12 to increase air circulation into and around the fuel. Preferably bottom rack 60 is formed by turning an integral lower margin of inner rack 54 in a direction parallel with floor 12 and away from sidewall 14 a sufficient distance to underlie and support outer rack 56. The inner rack is held in its spaced relationship from sidewall 14 by means of side margins 62 which are turned at right angles toward and in abutting relationship with this sidewall. Basket 52 is held in its spaced relationship above floor 12 by means of the opposite ends 64 of the bottom rack which are turned downwardly toward and in abutting relationship with the floor. The upper margin 66 of the inner rack is also turned at right angles to and in a direction away from sidewall 14 to form the upper wall of the basket. The inner rack can be easily removed from the housing for cleaning.

Outer rack 56 is removably mounted within housing 11 by means of a pair of elongate brackets 68, 70 secured by suitable means such as welding to the inside surfaces of sidewalls 16, 18 in parallel relationship with sidewall 14. The end portions 76, 78 of the side margins of the outer rack are bent through a small angle away from their mid-portions 78, as best illustrated in FIG. 3. Each bracket 68, 70 is of a sufficient length so that one side surface of its outwardly extending leg is engaged by the mid-portion of each rack side margin, while the opposite side surface of the leg is engaged by the end portions 76, 78. With housing in the vertical orientation of FIGS. 2 and 3 outer rack 56 is thereby supported above floor 12 by its contact with rack 60, while the engagement of end portions 76, 78 against brackets 68, 70 serves to prevent the outer rack from moving in a direction away from sidewall 14. With the housing in the horizontal orientation of FIG. 1 the engagement of the mid-portion of the rack side margins against the brackets prevents the outer rack from falling downwardly. At the same time, there is sufficient clearance and play between the outer rack and the brackets so as to permit the rack to be moved along the brackets for easy insertion into and removal from the housing.

Housing 11 is supported in its vertical orientation above the ground or patio surface by means of a first set of four short legs 80, 82. Each of these legs is mounted at a respective corner of floor 12. The housing is supported in its horizontal orientation by means of a second set of four short legs 84, 86. Each of these legs is mounted at a respective corner of first sidewall 14. The relatively short length of the two sets of legs permits the housing to be conveniently and readily tilted ad moved between either the horizontal orientation of FIG. 1 or the vertical orientation of FIG. 2.

Food is supported within the housing for cooking by means of a tray 88, and/or the alternate spit 90. Tray 88 preferably is of a grid-like configuration formed of suitable heat resistant wires 92, such as stainless steel wires, welded together in parallel relationship. Four U-shaped wires 94, 96 are secured to and depend downwardly from the periphery of the tray for resting upon and supporting the tray above outer rack 56 when the housing is in its horizontal orientation. A handle 98 of a suitable heat insulating material such as wood is secured to the tray to facilitate insertion and removal of the tray into and from the broiler.

The alternate spit 90 comprises a pointed rod formed of suitable heat resistant material such as stainless steel, and a wooden handle 100 is mounted at one end of the rod. A plurality, shown as three, of slots 102, 104 are formed in the edges 22, 24 of the sidewalls 16 and 18 for supporting opposite ends of the spit. The slots are inclined downwardly toward floor 12 so as to securely retain the spit both when the housing is in the horizontal orientation with the food above the coals, and when in the vertical orientation with the food alongside of the coals.

A plurality of adjustable vents 106 are formed in the housing for controlling air circulation. The vents include a pair of semi-circular openings formed in the sidewalls 16 and 18 immediately below the lower margin of basket 52. A valve comprising a semi-circular plate 108 is provided for controlling the rate of air flow through each opening. Each plate 108 is mounted for manual rotation across the opening by suitable means such as a bolt or rivet 110. With the plates turned upwardly as illustrated in FIG. 3 the openings are sustantially closed for a low rate of air circulation, and with the plates turned downwardly through 180° the openings are fully exposed for a high rate of air circulation. Air circulation from the housing is additionally controlled by means of a vent 112 formed in ledge 70 of the housing, and a vent 114 formed in top wall 40 of the hood. Each of the vents 112, 114 comprises a semi-circular opening and semi-circular rotatable plate assembled in a manner similar to that described for the vents 106.

A latch 116 is mounted at the front edge of hood top wall 40, and a cooperating latch plate 118 is mounted on housing upper ledge 30. Latch 116 is adapted to be rotated about a vertical axis for lockably engaging latch plate 118 for purposes of lifting, transporting and stowing the broiler. A carrying handle 120 formed of a suitable material such as wood is secured by brackets 121 to a mid-portion of the top wall 40 of the hood.

A flat pan 122 is removably supported on the upper surface of floor 12 at a position below spit 90. Pan 122 is adapted to receive and collect drippings, such as natural juices, grease or food particles, which fall downwardly from food supported on the spit when the housing is oriented vertically. A bracket 124 is secured on the outer side of sidewall 18 adjacent the slots 104. This bracket is adapted to removably mount a suitable rotisserie motor 126, such as an electric motor, for rotating the spit to evenly cook food with the hood open.

In operation, broiler 10 is prepared for use by first tilting the housing so that is is supported on its set of legs 84, 86 in the horizontal orientation of FIG. 1. Tray 88 and outer rack 56 are then removed from the housing. A number of charcoal briquets are spread across inner rack 54, and the outer rack is then reinserted with the mid and end portions of its side margins being secured about brackets 68, 70. The housing is then manually tilted 90° so that it is supported on its set of legs 80, 82 in the vertical orientation of FIG. 2. As the briquets settle down within the basket additional briquets, as desired, may be added by inserting them through the opening between the upper edge of outer rack 56 and upper margin 66 of the inner rack. A starter fluid is then sprayed onto the briquets and after a period of time the briquets are ignited and burned. The briquets are initially burned with hood 32 pivoted to its open position, as illustrated in FIG. 2, to provide for maximum draft. At the same time, vents 106 are opened to the desired extent so that air can freely circulate into the spaces below basket 52 and between the basket and housing sidewall 14. After the briquets have burned sufficiently to create hot coals of the desired temperature, broiler 10 can be used for cooking different foods in a variety of ways.

Where it is desired to cook food such as fowl or a roast upon spit 90, housing 11 is left in its vertical orientation and pan 122 is placed onto floor 12. The ends of the spit are then inserted into the slots 102, 104. The distance of the food from the coals can be varied by moving the spit into different pairs of the slots. Hood 32 is then pivoted upwardly until the desired air circulation clearance with the housing is achieved, and wing nut 50 is tightened down onto support member 46 for locking the hood in this position. The food is then cooked uniformly from all sides as radiant energy from the coals strikes the food directly as well as indirectly by reflection from opposite walls of the housing. This occurs without the requirement of turning the spit during cooking. At the same time all natural juices and grease drippings are saved as they fall down and are collected on the pan. The drippings thereby do not strike the coals and create smoke and odor, which could be objectionable in confined spaces. As desired, hood 32 may be opened with the housing in its vertical orientation and rotisserie motor 126 mounted on bracket 124 for turning the spit and food during the cooking phase.

Where it is desired to cook food with a smoked flvor, such as hamburgers, hot dogs and the like, housing is pivoted through 90° to its horizontal orientation of FIG. 1. The housing is pivoted by lifting the handle 120 which serves to apply a vertical force through the hood 32 to the housing rear wall 20. This vertical force acts offset from the center of balance of the housing to pivot the housing about the lower corner of front wall 14. This in turn causes the plane of the center of balance to shift in a horizontal direction so that it passes through the vertical plane encompassing the lower corner of the front wall so that the broiler is tilted to the horizontal orientation. Tray 88 is then set up on top of basket 52 and the hamburgers and other food are placed on top of the tray. Drippings from the food fall downwardly onto the coals to create the smoked flavor. Simultaneously with pivoting of the housing to its horizontal orientation the hood 32 is pivoted upwardly to the position illustrated in FIG. 1. Bread, buns or other food are placed upon end wall 34 of the hood where they are warmed by the heat radiating upwardly from the coals. In addition, spit 90 can be mounted across the slots of the housing in the horizontal orientation and the rotisserie motor mounted on bracket 124. Food placed upon the spit is then turned and cooked at the same time that food on the tray is cooked.

While the foregoing embodiments are at present considered to be preferred it is understood that numerous variations and modifications may be made therein by those skilled in the art and it is intended to cover in the appended claims all such variations and modifications as fall within the true spirit and scope of the invention.

I claim:

1. A charcoal broiler comprising the combination of a housing having a bottom floor, an open top, a pair of opposite side walls, a front wall having a lower corner, and a rear wall, all of said walls extending between the floor and the open top, a hood having a top wall, opposite side walls and a rear wall, hinge means for mounting a margin of the hood rear wall for pivotal movement about a transverse axis on an edge of the housing rear wall, said housing having a center of balance which is located within a vertical plane located between the front wall and rear wall of said housing, a handle mounted on the top wall of the hood, a perforate fuel-containing basket mounted within the housing, said basket extending in parallel relationship with the housing front wall, support means for supporting the broiler in a first orientation with the basket extending substantially vertical and in a second orientation with the basket extending substantially horizontal, said handle being positioned substantially on a mid-portion of the hood top wall and said axis of the hinge means being positioned substantially in a vertical plane which is horizontally offset from the center of balance of the hosuing when the housing is oriented in its first position whereby in such position a vertical lifting force applied to the handle by a user causes the hood to exert a vertical force on the housing at said hinge means to pivot the housing about said lower corner of the front wall which causes the plane of said center of balance to shift in a horizontal direction whereby it passes through the vertical plane encompassing the lower corner of the front wall for tilting the hosuing about said lower corner toward its second orientation, and with the housing in its second orientation a force applied against the handle which tends to pivot the hood away from the open top causes the hood to exert a force on the housing at said hinge means in a direction offset from said center of balance whereby the plane of said center of balance is shifted in a horizontal direction whereby it passes through the vertical plane encompassing the lower corner of the front wall for tilting the housing toward its first orientation.

2. A charcoal broiler comprising the combination of a center of balance housing having a bottom floor, an open top, first and second opposite sidewalls, a front wall having a lower corner and a rear wall, all of said walls extending between the floor and the open top, said housing capable of being supported in a vertical position with its front and rear walls upright, a hood having a top wall, opposite side walls and a rear wall which is pivotally mounted on said rear wall of the housing for movement of the hood to and from the open top of the housing about an axis which is horizontally offset from the center of balance of the housing when the latter is supported in said vertical position, said center of balance being located within a vertical plane between the front wall and rear wall of said housing, a handle mounted upon a mid-portion of said top wall of the hood located such that said handle upon being lifted applies a vertical force through the hood to said housing rear wall so that the force acts offset from said center of balance to pivot the housing about said lower corner of the front wall which causes the plane of said center of balance to shift in a horizontal direction whereby it passes through the vertical plane encompassing the lower corner of the front wall and tilts said broiler between said vertical position and a horizontal position while simultaneously opening the hood, a perforate fuel containing basket slidable mounted within the housing, said basket comprising an inner perforate rack positioned in spaced-apart relationship from said front wall on the housing and from said bottom wall, and outer perforate rack detachably mounted above the inner rack whereby with the outer rack removed fuel can be loaded into the inner rack when horizontally disposed, means for directing air into the housing and into and long opposite sides of said basket for burning fuel contained therein, support means for supporting the housing in said vertical position with the basket oriented vertically and also for supporting the housing in an alternate horizontal position with the basket oriented horizontally, a spit for carrying food, means for positioning the spit within the housing alongside the vertically disposed basket when the housing is supported in its vertical position, said last mentioned means also positioning the spit above the horizontally disposed basket when the housing is supported in its horizontal position.

3. A charcoal broiler as in claim 2 in which the support means includes leg means for supporting the housing in spaced relationship above the underlying surface to define a volume for warming food.

4. A charcoal broiler as in claim 2 in which the end wall of the hood is in a horizontal position when said hood is in its open position whereby said rear wall of the hood forms a support for holding food to be warmed.

5. A charcoal broiler as in claim 2 in which said open top is defined by means forming cut-out portions in the sidewalls having a first edge substantially parallel with said floor and a second edge substantially parallel with said first sidewall, and means forming slots in the first edges of the cut-out portions with the slots inclining in a direction toward the floor whereby a spit is retained in the slot with the housing disposed in either of its vertical or horizontal orientations for cooking of food on the spit.

* * * * *